Patented May 11, 1937

2,080,142

UNITED STATES PATENT OFFICE 2,080,142

TREATMENT OF ORGANIC COMPOUNDS

Charles D. Lowry, Jr., and Charles G. Dryer, Chicago, Ill., assignors to Universal Oil Products Company, Chicago, Ill., a corporation of Delaware No Drawing. Application June 30, 1934,
Serial No. 733,326

2 Claims. (Cl. 23—250)

This invention relates more particularly to the treatment of organic compounds useful in various commercial processes.

In a more specific aspect the invention is concerned with a method of treatment which has for its object the preservation of the properties of a specific compound and its derivatives which are subject to deterioration on standing, particularly when exposed to air or other oxidizing influences.

The class of organic compounds with which the invention is specifically concerned comprises furfural and its closely related derivatives such as, for example, furfuryl alcohol, furoic acid and its esters, hydrofuramide, etc.

Furfural is the aldehyde of furan and the relationship between the base compound and the aldehyde is shown in the two following structural formulas:

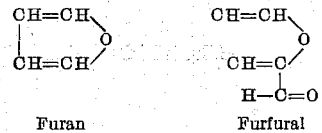

Furan           Furfural

Furfural when pure is a colorless liquid with an aromatic odor and is fairly soluble in water and very soluble in alcohol. It becomes brown on exposure to air and exhibits in general the properties of an aldehyde, combining with bisulfites and passing into furfuryl alcohol, under the reducing influence of sodium amalgam. It is changed to pyromucic acid by silver oxide and to the alcohol and acid by the action of caustic potash. The compound boils at 162° C., and has a specific gravity of 1.163. It is produced commercially by distilling bran, oat hulls or other husks of grain with dilute sulphuric acid and may also be manufactured by similar distillation of wood and mono carbohydrates and glucosides. The cause of the instability of furfural is deducible from the formula which shows the presence of double linkages in the heterocyclic ring, an atom of oxygen in the chain and an aldehyde group. The compound tends to polymerize and apparently undergo complicated decomposition reactions which lead to the formation of high boiling polymers and tarry or resinous products.

Furfural is used commercially as a solvent, particularly in the refining of lubricating oil fractions and in the refining of rosin in gasoline solution, as a fungicide and bactericide, as a material to be polymerized with phenols to produce resins and as a base for the production of flotation reagents, rubber accelerators, etc. When used as a solvent it is recovered by distillation and reused and undergoes considerable exposure to air during handling and in the case of the manufacturer of chemical derivatives it is most valuable when it retains its original properties including a definite boiling point and a generally light straw color.

In one specific embodiment the present invention comprises the use of wood tar and wood tar fractions as inhibitors in furfural and its derivatives.

I have determined that certain fractions of the tars produced in the distillation of woods, particularly those of the hardwood variety including hickory, beech, maple, oak, etc., are particularly efficacious in preserving the properties and quality of furfural and its closely related derivatives under the average conditions to which they are exposed in commercial storage and use. The amounts of wood tar fractions necessary for substantially complete inhibition of deterioration are small and usually of the order of from 0.01 to 0.5%, these quantities of selected wood tar fractions not being sufficient to alter the properties of the compounds to any undesirable extent, as will be shown in subsequent examples.

It has been found that the most desirable fractions of wood tars which are to be used as inhibitors boil within the approximate range of from 220 to 320° C., and that in most instances the peak of inhibiting efficiency corresponds to fractions boiling between 240 and 280° C. It has been further found that fractions produced by a careful vacuum distillation avoiding prolonged contact with iron or steel parts possess inhibiting properties superior to those possessed by corresponding fractions of a less carefully regulated distilling process. This is mentioned to give a few general indications of the types of wood tar fractions which are preferable in the present type of inhibitor process.

The wood tar fractions which are preferred for use are readily soluble in furfural and its derivatives in the amounts required for proper action and in adding the necessary quantities diffusion may be hastened by the use of moderately elevated temperatures with stirring although obviously care must be exercised when furfural is heated to expose it to the action of air or other oxidizing influences as little as possible, preferably by employing an inert gas such as nitrogen, carbon dioxide or flue gases above the liquid surface in a closed vessel. If desired, concentrates of wood tar in furfural may be made up and stored and a calculated amount added to further quantities of the material to be inhibited when desired.

The presence of a wood tar inhibitor in furfural is particularly advantageous when the compound is used as a selective solvent for preferentially extracting asphaltic and poor viscosity index material from crude lubricating oil stocks. The presence of the wood tar prevents deterioration both of the furfural and the "raffinate" constituting the layer of insoluble material which contains the compounds having the most desirable lubricating characteristics. When wood tar inhibitor is used, much less care needs to be exercised in excluding both solvent and lubricating stock from contact with air, which is a very practical consideration, particularly since somewhat elevated temperatures are employed in this solvent treating process to cut down the viscosity of the lubricating stocks. However, owing to partial solubility of the wood tar in the oil fractions, the recovered furfural may require further small additions of inhibiting material in case it is to be stored for any length of time prior to its reuse.

In the following example which is introduced to indicate the positive inhibiting action of wood tar fractions upon the deterioration in properties of furfural, analytical data involving the use of the so-called "peroxide test" is given. Experiments have shown that the loss in properties such as light color and low tar or pitch content corresponds to an initial development of considerable amounts of compounds of a peroxide character as evidenced by their ability to oxidize certain ferrous salts in aqueous solution. By the use of this test it has been shown that, if peroxide oxygen is not present above a certain amount, deterioration in in properties has not taken place. In the following table it is seen that when a sample of furfural was allowed to stand at ordinary temperature in contact with air, there was a gradual and definite development of peroxides whereas when 0.05% by volume of a 240 to 280° C., boiling range wood tar fraction was present the development of peroxide oxygen was greatly retarded, and kept below a point corresponding to the appearance of undesirably deep color.

*Storage tests of furfural with and without inhibitor*

| Days of storage | 0 | 4 | 8 | 18 |
|---|---|---|---|---|
| Peroxide content of sample without inhibitor | 0 | 2.29 | 3.72 | 7.70 |
| Peroxide content of sample with inhibitor | 0 | 0.16 | 0.23 | 0.25 |

During the period of storage the color of the uninhibited sample passed through light yellow to become a brownish yellow at the end of 18 days whereas the sample containing inhibitor had not changed perceptibly. It was further observed that the uninhibited sample had developed a disagreeable odor which was absent in the inhibited sample.

From the foregoing specification and numerical data it can be seen that the present process is a valuable contribution to the art of using inhibitors in unstable materials. However, neither the specification nor the figures used are to be taken as unduly limiting the scope of the invention.

We claim as our invention:

1. A method for preventing or reducing deterioration of furfural which comprises adding thereto a relatively small amount of a hardwood tar distillate boiling between 220° C. and 320° C.

2. A method for preventing or reducing deterioration of a substance selected from the group consisting of furfural, furfuryl alcohol, furoic acid and hydrofuramide, said method comprising the addition to said substance of a relatively small amount of a hardwood tar distillate boiling within the range of from 220 to 320° C.

CHARLES D. LOWRY, Jr.
CHARLES G. DRYER.